(12) United States Patent
Mowins

(10) Patent No.: US 6,609,862 B2
(45) Date of Patent: *Aug. 26, 2003

(54) TOOL BIT

(75) Inventor: Michael L. Mowins, Gloucester, MA (US)

(73) Assignee: Phillips Screw Company, Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/825,046

(22) Filed: Apr. 3, 2001

(65) Prior Publication Data

US 2002/0141841 A1 Oct. 3, 2002

(51) Int. Cl.$^7$ .......................... B23B 51/02; B23B 23/08
(52) U.S. Cl. ...................... 408/226; 81/185; 81/441; 279/143
(58) Field of Search .................. 408/226, 239 R, 408/240, 228; 81/177.2, 177.85, 185, 53.2, 186, 441, 436; 279/143, 144, 145

(56) References Cited

U.S. PATENT DOCUMENTS

| | | | |
|---|---|---|---|
| 1,738,405 A | 3/1929 | Thal | |
| 1,844,241 A | 2/1932 | Bryant | |
| 1,898,489 A | 2/1933 | Wickebergh | |
| 2,323,018 A | 6/1943 | Vellier | |
| 2,529,396 A * | 11/1950 | Hunt | 279/105.1 |
| 3,333,490 A * | 8/1967 | Popin | 408/226 |
| 3,894,450 A | 7/1975 | Hill et al. | 81/72 |
| 4,209,182 A | 6/1980 | Sheldon | 279/75 |
| 4,235,269 A | 11/1980 | Kraus | 81/438 |
| 4,246,811 A * | 1/1981 | Bondhus et al. | 81/436 |
| 4,536,107 A * | 8/1985 | Sandy et al. | 408/214 |
| 5,221,166 A * | 6/1993 | Bothum | 408/212 |
| 5,295,423 A | 3/1994 | Mikic | 81/438 |
| 5,335,409 A | 8/1994 | Elvebak | 29/451 |
| 5,351,586 A | 10/1994 | Habermehl et al. | 81/438 |
| 5,387,059 A * | 2/1995 | Borzemsky | 408/226 |
| 5,531,143 A | 7/1996 | Habermehl et al. | 81/438 |
| 5,535,648 A | 7/1996 | Braun et al. | 81/61.3 |
| 5,570,616 A | 11/1996 | Thompson et al. | 81/63.1 |
| 5,873,290 A | 2/1999 | Chaconas | 81/436 |
| 6,152,000 A * | 11/2000 | Mowins | 81/436 |
| 6,223,634 B1 * | 5/2001 | Hughes et al. | 411/404 |
| 6,269,717 B1 * | 8/2001 | Bollinger | 81/124.4 |

FOREIGN PATENT DOCUMENTS

| | | | | |
|---|---|---|---|---|
| AU | 26619/30 | | 5/1930 | |
| AU | 133442 | * | 7/1949 | 408/226 |
| DE | 112475 | | 8/1899 | |
| DE | 3344551 A1 | * | 6/1985 | 408/226 |
| DE | 4014381-a1 | * | 11/1991 | 408/226 |
| DE | 94 00 780 | | 3/1994 | |
| DE | 43 00 446 | | 6/1994 | |

* cited by examiner

Primary Examiner—Daniel W. Howell
(74) Attorney, Agent, or Firm—Hayes Soloway P.C.

(57) ABSTRACT

A drill bit has a chuck engaging shank portion having a geometric cross-sectional shape; a plurality of projections formed on at least a part of at least one of said surfaces; said projections (a) varying in height across said surface, and (b) engaging an inner surface of a chuck to prevent slippage of said bit in said chuck.

26 Claims, 8 Drawing Sheets

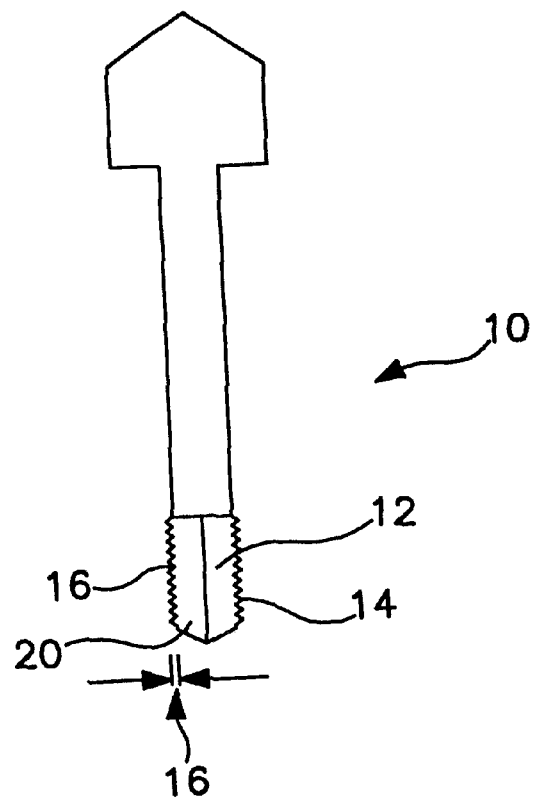
FIG. IA
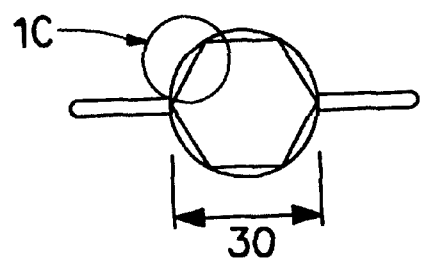
FIG. IB

TOOL BIT

BACKGROUND OF INVENTION

1. Field of the Invention

The present invention in one aspect relates to a tool, and in one aspect, to a drill bit with projections on the bit shank to interlock with surfaces of a drill chuck to reduce the tendency of the bit to slip in the drill chuck. In another aspect, the present invention relates to a driver tool, and more particularly, to a ball hex key for engaging various sockets, the key having projections on the portions thereof that engage a socket to interlock with the inner surface of the socket to reduce the tendency of the socket to slip off of the key. In still yet another aspect, the present invention relates to a size adaptor for a driver tool, the adaptor having projections on portions thereof that join other tools, to interlock with engaging surfaces of the other tools to reduce the tendency of the adaptor and tool to separate.

2. Brief Description of Related Art

Tools having removable bits for engaging and driving various fasteners into a workpiece are known. For example, screwdrivers that have interchangeable, removable bits are known. The prior art is dominated with hexagonal driver bits modified with various fasteners to be used in an appropriately modified bit holder. A clearance is provided between the holder and the driver bit to allow ease of insertion and changing of the bit. Various retention methods that rely on interference fits e.g., rubber O-rings, etc., or mechanical locking mechanism (snap rings, etc.), or magnetic attraction are currently used, but are subject to failure due to breakage, loss of parts, magnetic weakening and wear to the inner surfaces of the bit holder.

U.S. Pat. No. 4,209,182 issued to Sheldon discloses an axially movable sleeve retained in the bore of a portable rotary housing, disposed around a spindle to hold captive a ball key which releasably retains a screwdriver bit. The sleeve is retained in the housing by a spring retainer (or the like), whereby the bit (and the retainer) may be removed and replaced by axial displacement of the sleeve. Two patents from Habermehl et.al., U.S. Pat. Nos. 5,351,586 and 5,531,143 disclose a screwdriver with a replacement bit assembly, where the bit is secured to a mandrel that is axially slidable in a socket in the end of the mandrel. These patents teach a split-ring on the bit which serves to retain the bit in the socket.

Driver tools are also known in the art. For example, socket drivers are known to employ a displaceable ball bearing retaining mechanism to hold a plurality of sockets on the driver. However, such mechanism are also prone to wear, which can render the retaining mechanism ineffective. Similar driving devices having both male driving portions (e.g., hex keys, Allen™ wrenches, etc.) and female driving portions (e.g., socket wrenches, etc.) are known, but each suffered from the aforementioned problems associated with screwdriver bits.

Thus, although the prior art discloses various bit and driver retention mechanisms, none of the prior art provides a bit retention mechanism that can be used with standardized holders. Also, prior art devices suffer because there is the need to create complicated retention mechanisms and holders that can break, wear, or are expensive to manufacture.

SUMMARY OF THE INVENTION

Accordingly, the present invention solved the aforementioned drawbacks by providing a tool bit with a plurality of engaging projections that are formed within the standard geometric envelope of the shank of the bit, to permit the bit to be manufactured to standard dimensions.

Included in one preferred embodiment is a drill bit, comprising a shank portion having a geometric shape, e.g., hexagonal or circular, within a geometric envelope; and a plurality of projections formed on at least one of the sides or exterior surface of the shank and being within the geometric envelope; the projections engaging an inner surface of a bit holder or chuck to prevent slippage of the bit in the bit holder or chuck. Preferably, the projections have a triangular or sawtooth shape. Also preferably, the projections have a varying height across the surface; wherein the projections vary in height, from smallest height to biggest height, progressively across the surface.

Advantageously, the drill bit of the present invention has projections on the bit shank that engage the inner surface of the bit holder when torque is applied to the bit thereby preventing slippage of the bit in the chuck. Also advantageously, the shank with projections of the present invention can be manufactured to the tolerances of a conventional drill bit shank so that the bit can be stored in a standardized graded drill bit holder.

In another embodiment, a ball hex key is provided for engaging various sockets, the key having projections (as described above in reference to the first embodiment) on at least the portion thereof that engages a socket. Advantageously, the key provides projections to interlock with the inner surface of the socket to reduce the tendency of the socket to slip off of the key. Also advantageously, the key of the present invention can be manufactured to the tolerance of standard sockets, so that the key can be used within any standard socket.

In yet another embodiment of the invention, a driver size adaptor has projections (as above described) on portions of the surface thereof that engages or joins other tools, to interlock with engaging surfaces of the other tools to reduce the tendency of the adaptor and the tools to separate.

Although the following Detailed Description will proceed with reference being made to preferred embodiments, the present invention is not intended to be limited to these preferred embodiments. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 1A is a side elevational view of a drill bit in accordance with one embodiment of the present invention;

FIG. 1B is an end view of the drill bit of FIG. 1A;

DETAILED DESCRIPTION OF PREFERRED EMBODIMENTS

Figure 1C:
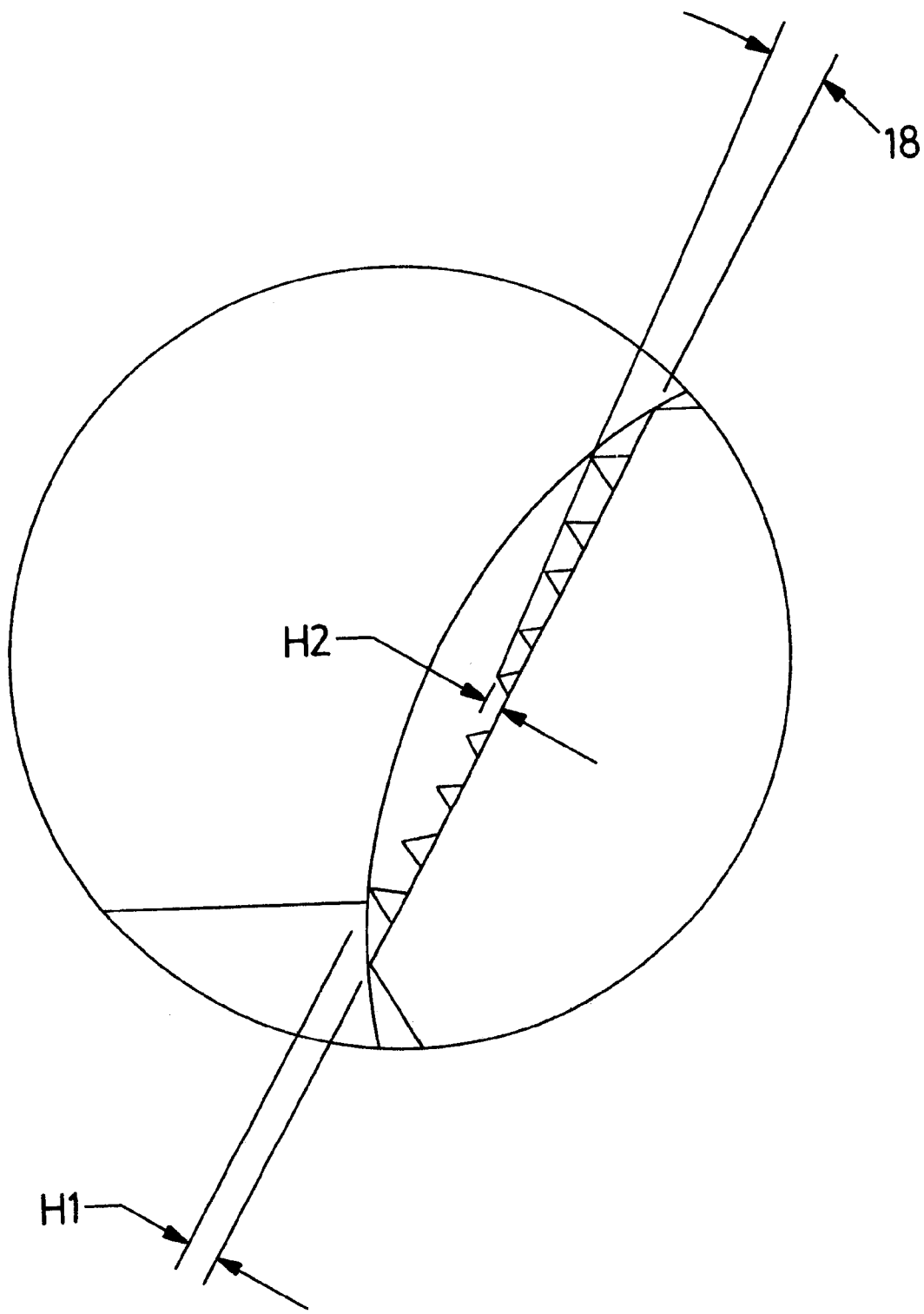
FIG. 1C is an enlarged view of a portion of FIG. 1B.

FIGS. 1A and 1B depict elevational and end views, respectively, of a drill bit 10 of the present invention. The drill bit is a spade bit with a hex shank end portion 20. As shown in FIG. 1B, the bit includes a main shaft defining a geometric envelope 30, having a plurality of flat sides in a geometric shape (e.g., hexagon, rectangle, etc.), with a plurality of surfaces 12. Provided on at least one of the surfaces 12 are one or more projections 14 that are formed on the surface 12 to a predetermined depth 16. The projections 14 can be provided across all or part of the surface 12.

Preferably, the projections 14 are provided on the surface 12 to a depth of between 0.002 and 0.004 inches, however, the depth of the projections can be altered without departing from the scope of the present invention. For example, the projections 14 may extend slightly above the surface 12, but within the geometric envelope 30. Also preferably, as shown in FIG. 1B, the projections 14 can vary in height of relief (as depicted by angle 18) across (perpendicular to the axis of rotation) the surface 12. Accordingly, the projections 14 would be of greatest height on the edge of the holder engageable surface where maximum torsional loading occurs when a fastener is being driven by the bit 10. (See FIG. 1C. Note $h_1 > h_2$.

Figure 2A:
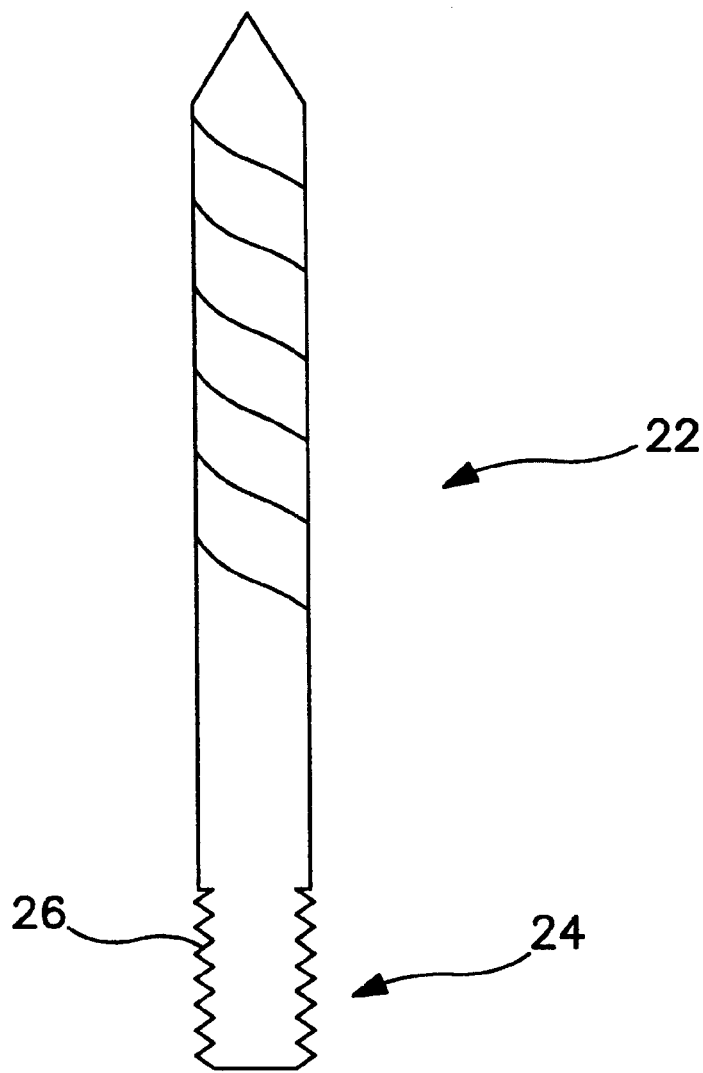
FIG. 2A is a side elevational view of a drill bit in accordance with another embodiment of the present invention.
Figure 2B:
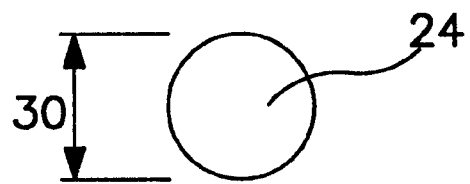
FIG. 2B is an end view of the drill bit of FIG. 2A.

The bit 22 as shown in FIGS. 2A and 2B is similar to the above-described embodiment of FIGS. 1A and 1B, except that the shank end of the shaft 24 is round in cross-section. As depicted in FIG. 2A, projections 26 are formed on the periphery surface of the shank. When rotational force is applied to the bit, the projections 26 engage the inner surface of the chuck in such a manner as to prevent slippage of the bit under torque.

Figure 2C:
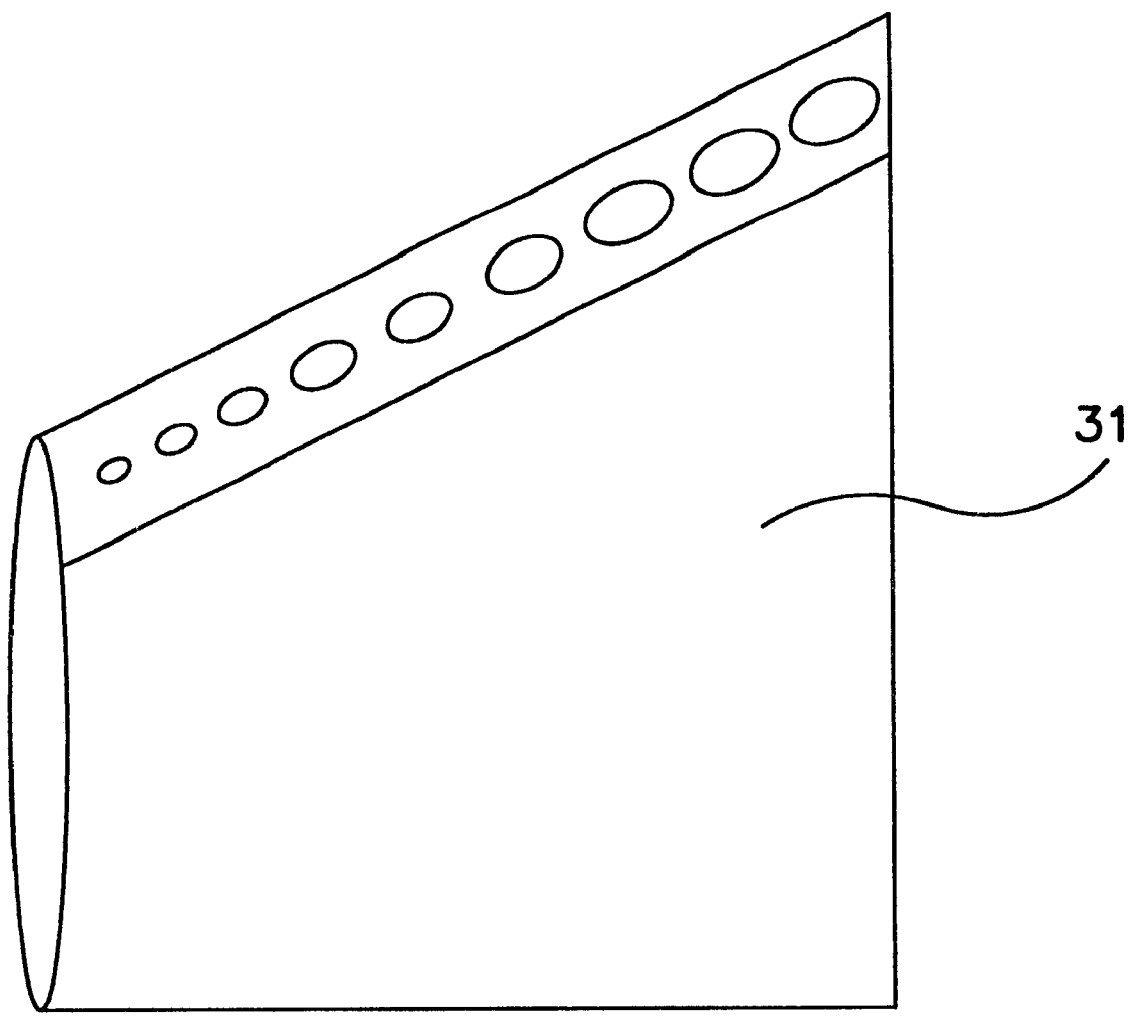
FIG. 2C is a perspective view of a drill bit holder for use with the drill bit of FIG. 2A.

A key feature of the present invention is to provide a drill bit that can be used with standardized bit holders or chucks and also may be stored in a standardized graded drill bit holder. Accordingly, the bit 22 of the present invention is formed to an appropriate geometric shape that is within a geometric envelope of a conventional drill bit holder. Thus, the bits 22 of the present invention has a geometric envelope 30 (i.e., cross-sectional diameter) that are within the manufacturing tolerances of a conventional graded drill bit holder 32 (see FIG. 2C).

Figure 3A:
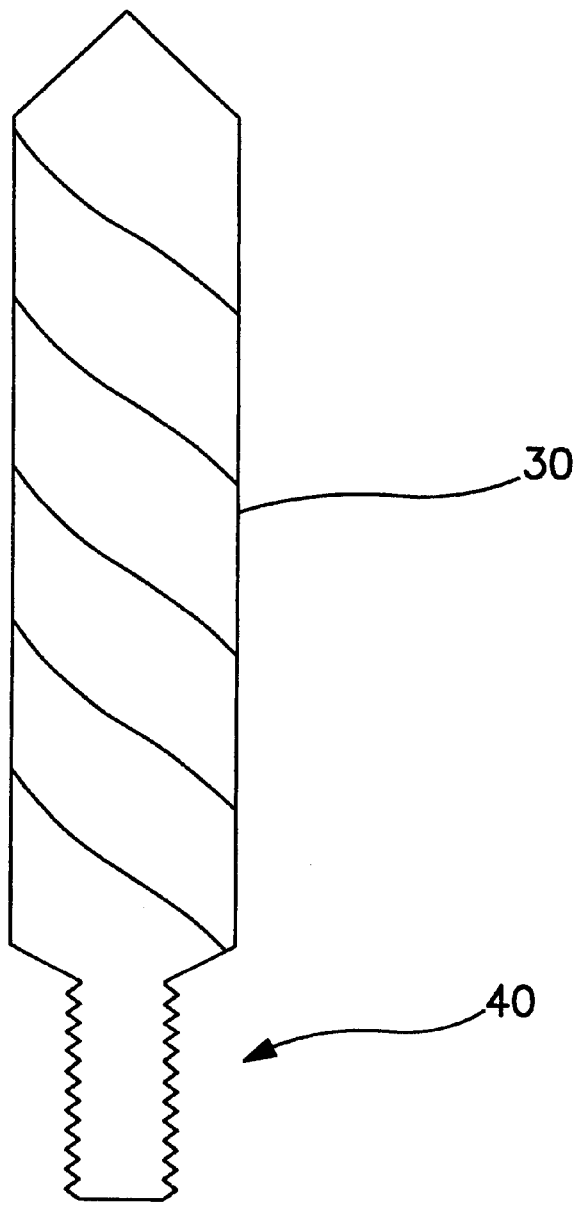
FIG. 3A is a side elevational view of a drill bit in accordance with yet another embodiment of the present invention.
Figure 3B:
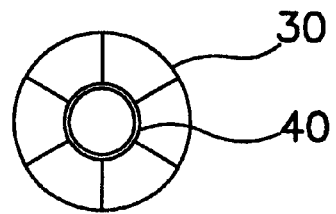
FIG. 3B is an end view of the drill bit of FIG. 3A.

Referring to FIGS. 3A and 3B, there is illustrated yet another embodiment of the invention. In the embodiment of FIGS. 3A and 3B, the shank end of the drill shaft is reduced in diameter, i.e., at 40, so that a large diameter drill bit may be used in a smaller diameter drill chuck. For example, a ½ inch drill bit may be accommodated in a ¼ inch drill.

Figure 4A:
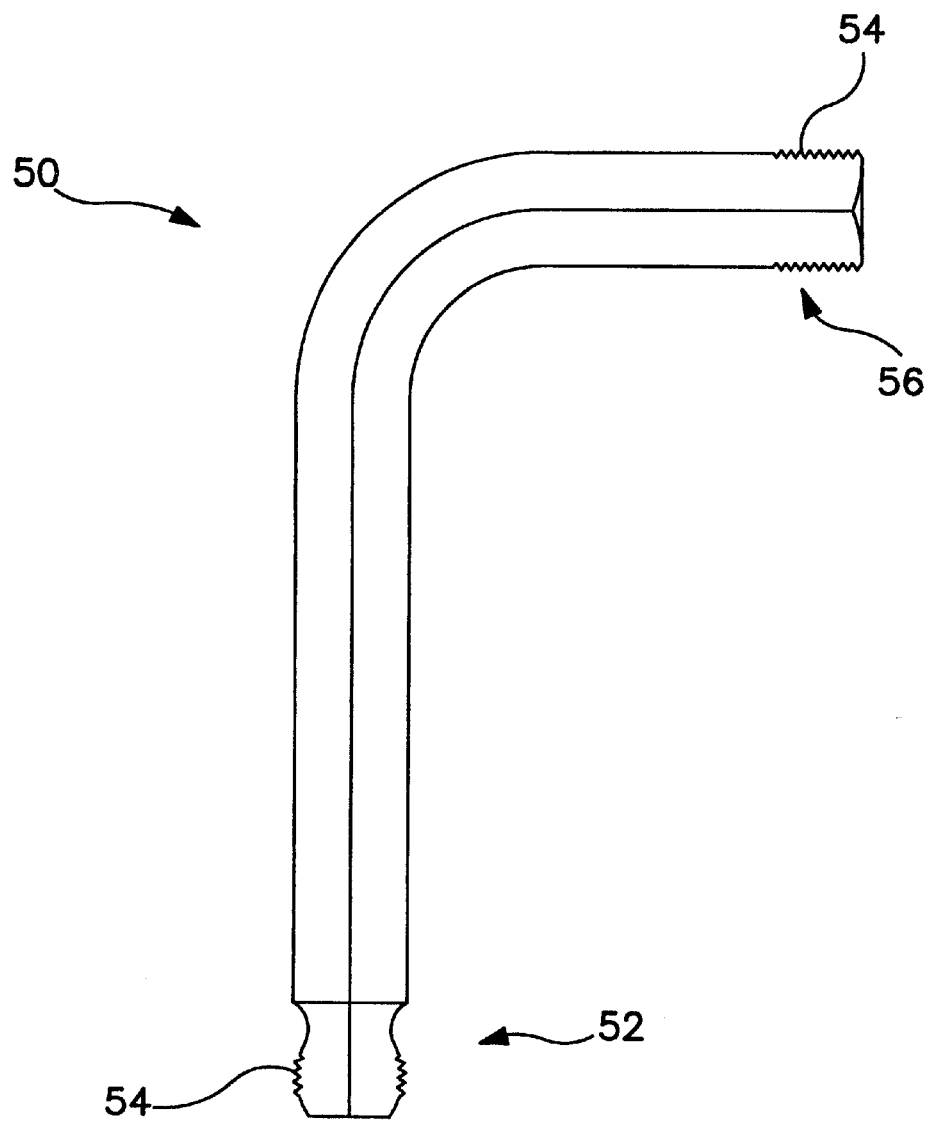
FIG. 4A is a side elevational view of an exemplary ball hex key made in accordance with yet another embodiment of the present invention.
Figure 4B:
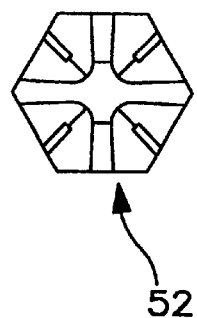
FIG. 4B is a cross-sectional view of the ball hex key of FIG. 4A.

In another embodiment, illustrated in FIGS. 4A and 4B, a ball hex key 50 is provided with projections, as described above with reference to the drill bit, on the engagement end 52 (i.e., male end). The projections 54 are provided to engage the inner surfaces of a socket or threaded fastener. In this case, the portion carrying the projections 54 engage a socket or threaded fastener. Additionally, and optionally, projections 54 may be formed on the other end 56 of the key as well. Also similar to the previous embodiments, the key 50 has a geometric envelope (cross-sectional diameter) that is within the manufacturing tolerance of the socket, or other piece. In addition, the projections 54 can vary in height of relief across the surface.

Figure 5A:
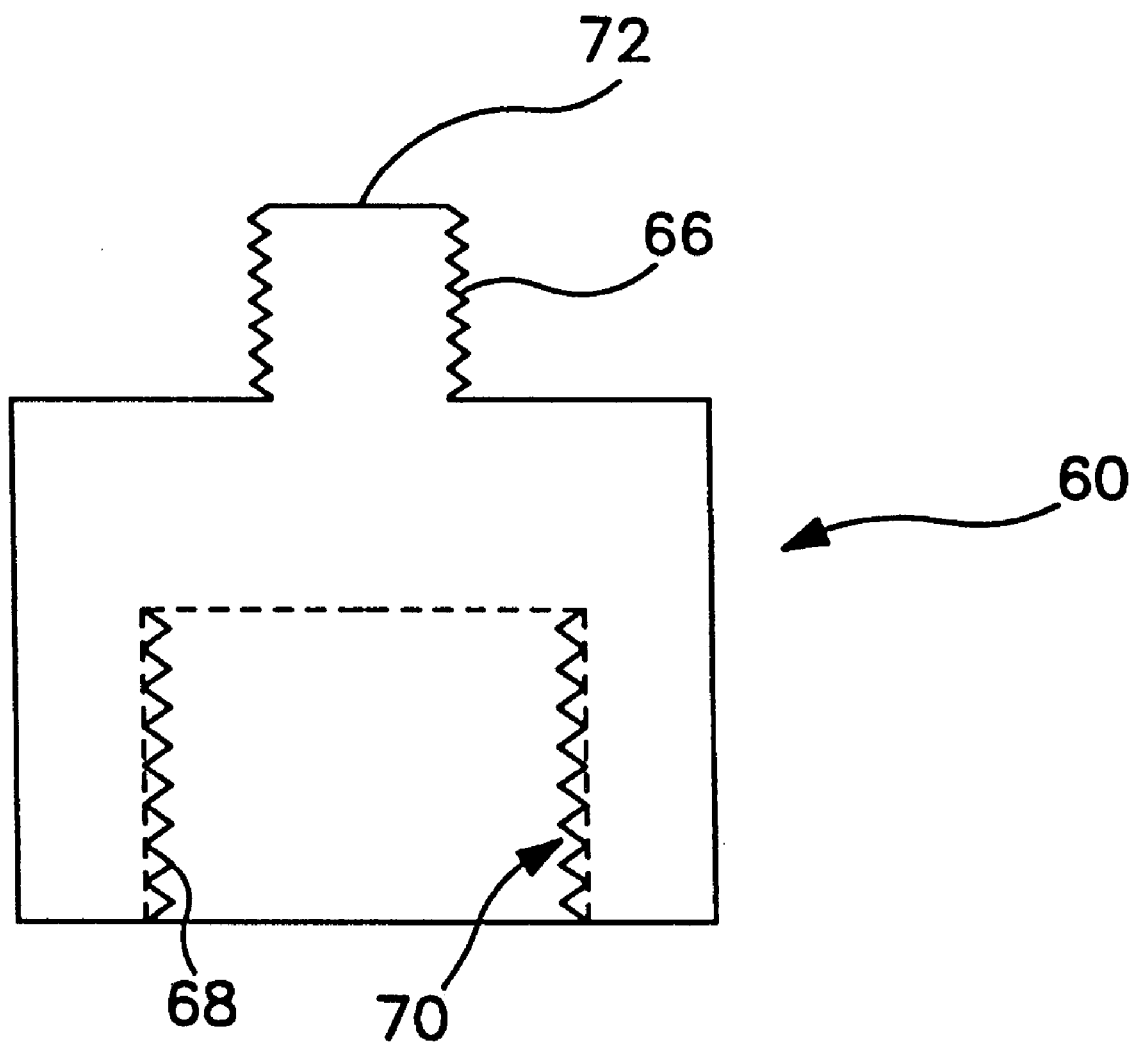
FIGS. 5A and 5B are views similar to FIG. 4A, in partial cross-section, of a driver adaptor made in accordance with yet another embodiment of the invention.
Figure 5A:
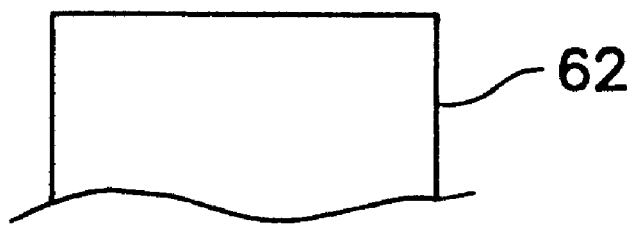
Figure 5B:
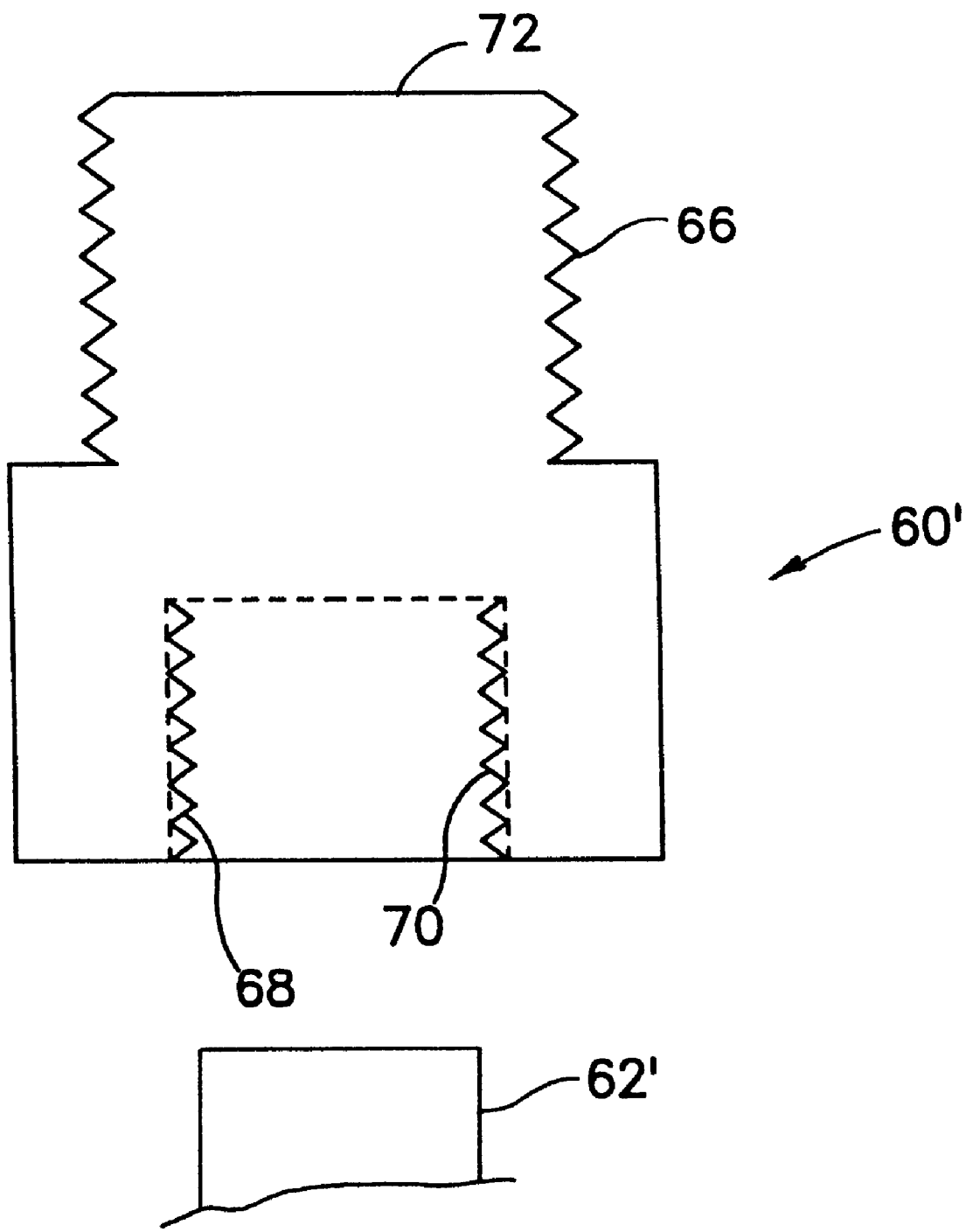

The invention is susceptible to further modification. For example, as shown in FIGS. 5A and 5B, a driving tool adaptor 60 and 60', respectively, comprises a square drive socket wrench size adaptor for reducing, e.g. a ½ inch square drive 62 to a ¼ inch square drive (FIG. 5A), or for stepping up, e.g., from a ¼ inch square drive 62' to a ½ inch square drive (FIG. 5B). As in the case of the earlier embodiments, projections 66 are formed on one or more surfaces of a drive stud 72 for enhancing engagement of the drive stud 72 with a socket. As before, projections 66 are contained within the geometric envelope of the drive stud. Also, if desired, one or more of the interior wall surfaces 68 may be provided with projections 70 for engaging with a driving tool.

Thus, it is evident that there has been provided a tool that fully satisfies both the aims and objectives hereinbefore set forth. It will be appreciated that although specific embodiments and methods of use have been presented, many modifications, alternatives and equivalents are possible. For example, the projections can have different shapes, e.g., spikes, circular indents, etc. without departing from the scope of the present invention. Also, as shown in FIGS. 1A and 3A, the projections may be individually formed at an angle with respect to the surface, e.g., angled away from the driving portion of the shank. Of course, the present invention can be modified with other projection angles without departing form the scope of the present invention. In addition, although the bits described above have been in reference to hexagonal, round and square bits, any geometric cross-sectional shape (e.g., triangular, rectangle, etc.), may be employed. The present invention also can be modified to incorporate the projections, as described herein, on the inner surfaces (i.e., female surfaces) of a socket or other driving mechanism.

Thus, advantageously, the present invention a bit tool that can be manufactured easily, and that can be used with bit holders and sockets of standardized dimensions.

What is claimed is:

1. A drill bit comprising:
  a chuck engaging shank portion having a geometric cross-sectional shape with a plurality of projections formed on at least a portion of an exterior surface thereof, said projections (a) varying in height across said surface in a direction generally perpendicular to an axis of rotation of the drill bit, and (b) engageable with an inner surface of a chuck of a drill to prevent slippage of said drill bit in said chuck.

2. A drill bit as claimed in claim 1, wherein said projections have a triangular shape.

3. A drill bit as claimed in claim 1, further comprising a main shaft coupled to the chuck engaging portion, the main shaft defining a geometric envelope, wherein the projections extend above the exterior surface but do not extend beyond the geometric envelope.

4. A drill bit as claimed in claim 1, wherein said geometric shape is a hexagon and said projections are within the cross-sectional diameter of said hexagon, plus or minus manufacturing tolerances.

5. A drill bit as claimed in claim 1, wherein said geometric shape is circular and said projections are within the cross-sectional diameter of said circle, plus or minus manufacturing tolerances.

6. A drill bit as claimed in claim 1, wherein said height of said projections is about 0.002 inches to 0.004 inches.

7. A drill bit as claimed in claim 1, wherein said projections vary in height, from smallest height to biggest height, progressively across said surface.

8. A drill bit as claimed in claim 1, wherein said drill bit comprises a twist drill.

9. A drill bit as claimed in claim 1, wherein said drill bit comprises a spade drill.

10. A drill bit as claimed in claim 1, wherein said shank portion has a reduced cross-sectional area relative to other portions of said drill bit.

11. A drill bit as claimed in claim 10, wherein said shank reduced cross-sectional area has a hexagonal shaped cross-section.

12. A drill bit as claimed in claim 10, wherein said shank reduced cross-sectional area has a round cross-section.

13. A driver tool adaptor for engaging a socket, comprising a driver portion having a plurality of surfaces forming a geometric shape of a first cross-sectional area; a plurality of projections formed on at least a part of at least one of said surfaces; said projections (a) varying in height across said surface in a direction generally perpendicular to an axis of rotation of the driver tool, and (b) engageable with an inner surface of a socket to prevent slippage of said socket from said driver portion; said driver tool having a second portion having a cross-sectional area different from the first portion.

14. A driver tool as claimed in claim 13, wherein said projections have a triangular shape.

15. A ball hex tool for engaging a socket, comprising a driver portion having a plurality of surfaces forming a geometric shape of a first cross-sectional area; a plurality of projections formed on at least a part of at least one of said surfaces; said projections (a) varying in height across said surface in a direction generally perpendicular to an axis of rotation of the ball hex tool, and (b) engageable with an inner surface of a socket to prevent slippage of said tool in said socket.

16. A driver tool as claimed in claim 13, wherein said geometric shape is a hexagon and said projections are within the cross-sectional diameter of said hexagon, plus or minus manufacturing tolerances.

17. A driver tool as claimed in claim 13, wherein said geometric shape is a rectangle and said projections are within the cross-sectional diameter of said rectangle, plus or minus manufacturing tolerances.

18. A driver tool as claimed in claim 13, wherein said projections vary in height, from smallest height to biggest height, progressively across said surface.

19. A tool as claimed in claim 15, wherein said projections being formed at an angle with respect to said surface.

20. A driver tool as claimed in claim 13, wherein said driving portion being manufactured to the tolerance of said socket.

21. A tool as claimed in claim 15, wherein said projections engage said inner surface of said socket when torque is applied to said driving tool.

22. A tool as claimed in claim 15, wherein said driving portion being manufactured to the tolerance of said socket.

23. A tool as claimed in claim 15, wherein said projections have a triangular shape.

24. A tool as claimed in claim 15, wherein said projections vary in height, from smallest height to biggest height, progressively across said surface.

25. A tool as claimed in claim 15, wherein said geometric shape is a hexagon and said projections are within the cross-sectional diameter of said hexagon, plus or minus manufacturing tolerances.

26. A tool as claimed in claim 15, wherein said geometric shape is a rectangle and said projections are within the cross-sectional diameter of said rectangle, plus or minus manufacturing tolerances.

* * * * *